United States Patent [19]

Ogawa et al.

[11] 4,320,159

[45] Mar. 16, 1982

[54] MAGNETIC RECORDING MEDIUM

[75] Inventors: Hiroshi Ogawa; Hiromi Nakahara; Yasuo Tamai, all of Odawara, Japan

[73] Assignee: Fuji Photo Film Co., Ltd., Minami-ashigara, Japan

[21] Appl. No.: 119,970

[22] Filed: Feb. 8, 1980

Related U.S. Application Data

[63] Continuation-in-part of Ser. No. 918,819, Jun. 26, 1978, abandoned.

[51] Int. Cl.$^3$ .............................................. B32B 3/02
[52] U.S. Cl. .................................... 428/64; 428/331; 428/337; 428/339; 428/402; 428/412; 428/428; 428/433; 428/450; 428/452; 428/458; 428/464; 428/694; 428/695; 428/900
[58] Field of Search ................. 428/900, 303, 329, 64, 428/337, 331, 339, 402, 695, 694, 412, 428, 433, 450, 452, 458, 464

[56] References Cited

FOREIGN PATENT DOCUMENTS 49-11909 2/1974 Japan .
49-12802 2/1974 Japan .

*Primary Examiner*—Bernard D. Pianalto
*Attorney, Agent, or Firm*—Armstrong, Nikaido, Marmelstein & Kubovcik

[57] ABSTRACT

The present invention relates to a magnetic recording medium having on a non-magnetic support a magnetic layer comprising a ferromagnetic fine powder in a binder, in which a colloidal silica having a diameter of 7 to 50 m$\mu$ and methyl groups on the surface thereof is added in a proportion of 2 to 20 parts by weight to 100 parts by weight of the ferromagnetic fine powder during dispersion of the coating composition of the ferromagnetic fine powder.

10 Claims, 1 Drawing Figure

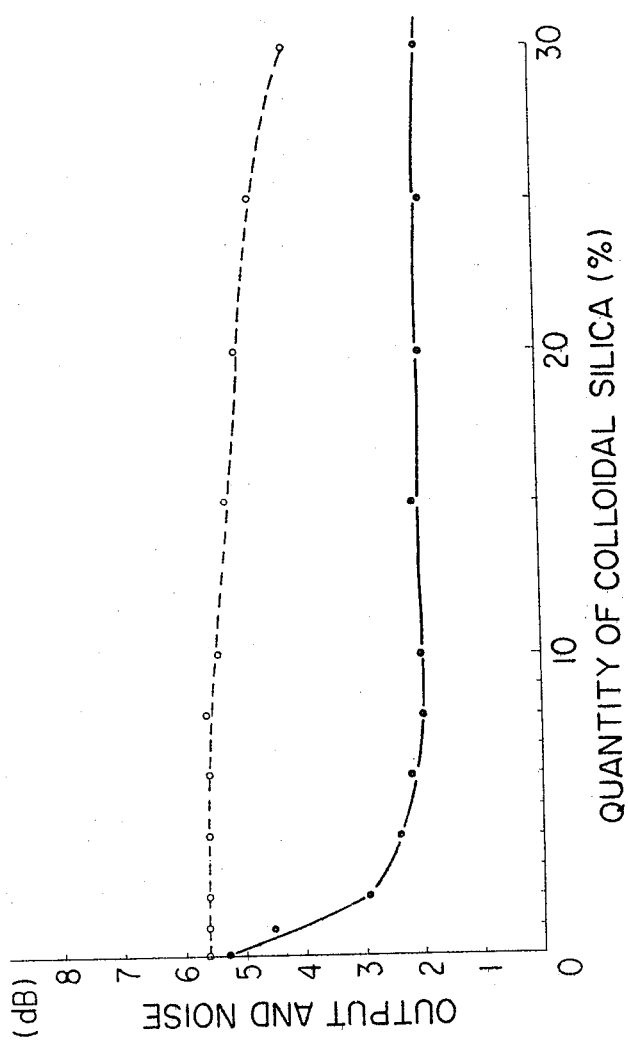

MAGNETIC RECORDING MEDIUM

This application is a continuation-in-part application of prior application Ser. No. 918,819, filed June 26, 1978 and now abandoned.

BACKGROUND OF THE INVENTION

1. Field of the Invention

This invention relates to a magnetic recording medium and a process for the production thereof and more particularly, it is concerned with a magnetic recording medium with a low noise level and a process for the production of the same.

2. Description of the Prior Art

Ferromagnetic materials used in magnetic recording substances such as audio tapes, video tapes, memory tapes, magnetic sheets and magnetic cards are fine powders of ferromagnetic iron oxides, cobalt ferrite, ferromagnetic chromium dioxide and ferromagnetic metals or thin films of ferromagnetic metals. These magnetic recording substances have been used in a wide variety of technical fields wherein electric or magnetic signals are recorded and reproduced and, of late, a system of recording, in particular, a short wave-length signal in a high density has been watched with keen interest. Accordingly, magnetic recording properties suitable for high density recording, for example, a considerably high coercive force and large residual flux density are required for ferromagnetic materials. Moreover, it is necessary, for example, for magnetic cards, that demagnetization due to heating or pressing is little. Metallic ferromagnetic materials have been considered most promising for high density recording with low demagnetization.

On the other hand, the recording wave-length in a video tape is much shorter than in a sound recording. For example, in a VTR (video tape recorder) for broadcasting, a short wave to a minimum wave-length of about 2 microns has to be recorded. In particular, a VTR using a minimum wave-length of about 0.6 to 1 micron has lately been developed. However, the above described oxide-type magnetic substances are not suitable for magnetic recording of a signal of short recording wave-length (about 2 microns or less), because their magnetic properties such as particle shape, particle size, coercive force and residual magnetic flux density are insufficient for high density recording.

Development of ferromagnetic metal powders capable of satisfying these properties and suitable for high density recording has lately been carried out actively. The following six methods are known as a method of preparing the ferromagnetic metal powder:

(1) A method comprising heat-decomposing an organic acid salt of a ferromagnetic metal and reducing with a reducing gas. This method is described in, for example, Japanese Pat. Publication Nos. 11412/1961; 22230/1961; 14809/1963; 3807/1964; 8026/1965; 8027/1965; 15167/1965; 16899/1965 (U.S. Pat. No. 3,186,829); 12096/1966; 14818/1966 (U.S. Pat. No. 3,190,748); 24032/1967; 3221/1968; 22394/1968; 29268/1968; 4471/1969; 27942/1969; 38755/1971; 38417/1971; 41158/1972; and 29280.

(2) A method comprising reducing a needle-like iron oxyhydroxide, substance containing metals other than iron as well as the above oxyhydroxide or needle-like iron oxide derived from the oxyhydroxide. This method is described in, for example, Japanese Patent Publication Nos. 3862/1960; 11520/1962; 20335/1964; 20939/1964; 24833/1971; 29706/1962; 30477/1972 (U.S. Pat. No. 3,598,563); 39477/1972 and 24952/1973; Japanese patent application (OPI) Nos. 5057/1971; 7153/1971; 79153/1973; and 82695/1973 and U.S. Pat. Nos. 3,607,220 and 3,702,270.

(3) A method comprising evaporating a ferromagnetic metal in an inert gas at a low pressure. This method is described in, for example, Japanese Pat. Publication Nos. 25620/1971; 4131/1972 and 27718/1972 and Japanese patent application (OPI) Nos. 25662/1973; 25663/1973; 25664/1973; 25665/1973; 31166/1973; 55400/1973 and 81092/1973.

(4) A method comprising heat-decomposing a metal carbonyl compound. This method is described in Japanese Patent Publication Nos. 1004/1964; 3415/1965 and 16868/1970; and U.S. Pat. Nos. 2,983,997; 3,172,776; 3,200,007 and 3,228,882.

(5) A method comprising electrodepositing a ferromagnetic metal powder using a mercury cathode and then separating the metal powder from mercury. This method is described in, for example, Japanese Pat. Publication Nos. 12910/1960; 3860.1961; 5513/1961; 787/1964; 15525/1964; 8123/1965; 9605/1965 (U.S. Pat. No. 3,198,717); 19661/1970 (U.S. Pat. No. 3,156,650) and U.S. Pat. No. 3,262,812.

(6) A method comprising reducing a solution containing a ferromagnetic metal salt by adding a reducing agent thereto. This method is described in, for example, Japanese Pat. Publication Nos. 20520/1963; 26555/1963; 20116/1968; 9869/1970; 14934/1970; 7820/1972; 16052/1972; 41718/1972; 41719/1972 (U.S. Pat. No. 3,607,218); Japanese patent application (OPI) Nos. 1353/1972 (U.S. Pat. No. 3,756,866), 1363/1972; 42252/1972; 42253/1972; 44194/1973; 79754/1973; 82396/1973 and 41899/1974 and U.S. Pat. Nos. 3,206,338; 3,494,760; 3,535,104; 3,567,525; 3,661,556; 3,663,318; 3,669,643, 3,672,867; and 3,726,664.

In a tape wherein a ferromagnetic metal powder obtained by each of these methods is mixed or dispersed in a binder and dispersing agent and coated onto a support member, however, the noise level is high due to that the dispersibility of the ferromagnetic metal powder is low, which constitutes a bar for the practical use of a magnetic recording medium using such a ferromagnetic metal powder. This is considered to be due to the fact that the ferromagnetic metal powder has an active surface and hydrophilic property and is hardly miscible with the binder. In particular, a ferromagnetic metal powder obtained by the reduction with a phosphinate compound or borohydride compound in aqueous solution has a very low miscibility with binders and, therefore, it is difficult to prepare a magnetic recording medium with a high output and low noise level from such a ferromagnetic metal powder.

SUMMARY OF THE INVENTION

It is an object of the invention to provide a magnetic recording medium with a low noise level.

It is another object of the invention to provide a magnetic recording medium having on a non-magnetic support a magnetic layer comprising a ferromagnetic fine powder dispersed in a binder.

It is a further object of the invention to provide a process for the production of a magnetic recording medium with a low noise level.

It is a still further object of the invention to provide an improved magnetic recording substance whereby the above described disadvantages of the prior art can be overcome.

These objects can be attained by a magnetic recording medium having on a non-magnetic support a magnetic layer comprising a ferromagnetic fine powder dispersed in a binder, in which colloidal silica having a diameter of 7 to 50 mµ and methyl groups on the surface thereof is added during dispersion of the coating composition of the ferromagnetic fine powder.

BRIEF DESCRIPTION OF THE FIGURE

The accompanying drawing is a graph showing the relation of the quantity of a colloidal silica with the output and noise of a video tape in one embodiment of the present invention.

DETAILED DESCRIPTION OF THE INVENTION

We, the inventors, have made efforts to provide a magnetic recording medium having a high output and a low noise level using a ferromagnetic metal powder. That is to say, the inventors have made studies on various methods to increase the dispersibility of alloy fine powders of liquid phase reduction type and consequently have found that a magnetic recording medium with a markedly decreased noise level can be obtained by preparing a magnetic coating composition containing colloidal silica having a diameter of 7 to 50 mµ and methyl groups on the surface thereof, added during dispersion of a ferromagnetic fine powder and coating the magnetic coating composition onto a non-magnetic support, followed by drying. The present invention is based on this finding. In summary, the present invention provides a magnetic recording medium having on a non-magnetic support a magnetic layer comprising a ferromagnetic fine powder dispersed in a binder, characterized in that the magnetic layer contains colloidal silica. Furthermore, in accordance with the present invention, there is provided a process for the production of a magnetic recording medium, which comprises dispersing a ferromagnetic fine powder in a binder while simultaneously adding thereto colloidal silica having a diameter of 7 to 50 mµ and methyl groups on the surface thereof to thus prepare a magnetic coating composition, coating the magnetic coating composition onto a non-magnetic support and then drying.

In the prior art, addition of colloidal silica to a magnetic layer is also carried out as disclosed in Japanese patent application (OPI) Nos. 11909/1974 and 12802/1974, which aim at strengthening a binder and thus need a step of mixing previously the binder and colloidal silica. It is further found that, if such a strengthened binder prepared by mixing previously a binder and colloidal silica is used, the object of the present invention cannot be obtained. This is possibly due to that in this step, the binder is bridged partly by colloidal silica and thus the dispersibility of the binder is lowered.

The colloidal silica used in the present invention is silicic anhydride having a diameter of 7 to 50 mµ, preferably 10 to 30 mµ which is generally prepared by combustion of silicon tetrachloride. The silanol groups on the surface of colloidal silica are decreased by treatment with methanol, trimethylmonochlorosilane, dimethyldichlorosilane and the like to replace at least 70% of the silanol groups with methyl groups. The thus treated colloidal silica having 70% or more of the silanol groups on the surface replaced with methyl groups is used in the present invention. The noise level and other desired properties of the magnetic recording medium deteriorate rapidly with the use of colloidal silica in which less than 70% of the silanol groups have been replaced with methyl groups. This methyl group replacement is generally carried out by heating colloidal silica in methanol vapor for 30 minutes to 6 hours or by treating colloidal silica and tetrachlorosilane with methanol vapor for 30 minutes to 6 hours. More preferably, colloidal silica with dimethyldichlorosilane and steam are subjected to heating or reaction at about 400° C. in a fluidized bed using an inert gas such as nitrogen gas as a carrier. In the colloidal silica obtained in this way, 70% or more of the silanol groups on the surface are replaced by methyl groups. The colloidal silica has one silanol group ($\equiv$Si—OH) bonded to the surface thereof per 28~33 $A^2$ (square Angstrom), and thus, a colloidal silica with a specific surface of 200 $m^2/g$ has about $6 \times 10^{20}$ silanol groups in 1 g, which means that one particle of colloidal silica has about 2,000 silanol groups. Therefore, about 1400 or more silanol groups in each particle of the above described colloidal silica are replaced by methyl groups. These silanol groups and methyl groups can be analyzed by means of an infrared ray spectroscope. It is not clear why such a colloidal silica having methyl groups is preferable, but the reason is possibly that the surface thereof is hydrophobic and miscible with binders.

The colloidal silica used in the present invention is added when a ferromagnetic fine powder and binder are mixed, kneaded or dispersed. Addition after the dispersion is not preferable because the object of the present invention cannot completely be attained. The quantity of colloidal silica to be added is generally 2 to 20 parts by weight, preferably 3 to 10 parts by weight, more preferably 4 to 8 parts by weight per 100 parts by weight of a ferromagnetic fine powder. If the quantity is less than 2 parts by weight, the effects or advantages of the present invention cannot be obtained, while if more than 20 parts by weight are used, not only the magnetic flux density of the magnetic recording medium is low, but also the adhesiveness of the magnetic recording layer to a support is deteriorated and the magnetic recording layer tends to peel off.

Methods of preparing the magnetic coating composition used in the present invention are described in detail in Japanese Pat. Publication Nos. 186/1968; 28043/1972; 28045/1972; 28046/1972; 28048/1972; and 31445/1972. The magnetic coating compositions in these patents mainly comprise a ferromagnetic powder, a binder and a coating solvent, and in addition, the composition can contain additives such as a dispersing agent, a lubricant, an abrasive, an antistatic agent and the like.

The ferromagnetic powder which can be used in the present invention includes ferromagnetic alloy fine powders, ferromagnetic iron oxides, ferromagnetic chromium dioxide, etc., and for the purpose of achieving the advantages of the present invention, it is preferable to use ferromagnetic alloy fine powders, above all, those obtained by the method (6). The ferromagnetic metal salt used in this method means a salt containing, as a main component, iron, cobalt, nickel, iron-cobalt, iron-nickel, cobalt-nickel or iron-cobalt-nickel and, optionally, a minor amount of one or more salts of lanthanum, cerium, neodymium samarium, aluminum, sulfur, chromium, manganese, copper, tin and zinc to improve the magnetic property and oxidation stability. Examples of these metal salts are sulfates, chlorides, nitrates, formates, acetates, sulfamates and pyrophosphates.

As the reducing agent for effecting the reducing reaction, there can generally be used one or more of acids or salts containing hypophosphite ion, borohydride compounds such as sodium borohydride, borane and borazane or derivatives thereof, hydrazine or derivatives thereof and reducing gases such as hydrogen and carbon monoxide. The above described metal salt is reduced by this reducing agent to precipitate the corresponding ferromagnetic metal or alloy.

The concentration of borohydride compounds or derivatives thereof used as a reducing agent is preferably 0.0002 to 10 mol/l and the reaction is preferably carried out within a range of a reducing agent/metal ion molar ratio of 0.1 to 5.

The reaction conditions in this method are not particularly limited but, preferably, the reaction pressure is 0.5 to 5 atmospheres and the reaction temperature and pH depend on a reducing material used. Preferably, the reaction temperature is 65° to 90° C. and pH is 8 to 12 in the system of hypophosphite; the temperature is −5° to 60° C. and pH is 1 to 12 in the system of a borohydride compound; and the temperature is 60° to 100° C. and pH is 7.5 to 12 in the system of hydrazine. The action of a magnetic field is useful at several ten oersteds or more and a DC magnetic field, AC magnetic field or pulse magnetic field is effective.

The concentration of a metal ion should be adjusted to such as not to give its supersaturation or less. If the concentration is too high, various problems arise that the properties of the resultant powder are deteriorated, the reaction yield is lowered and enlargement of the reaction apparatus becomes necessary due to foaming, whilst, if the concentration is too low, the powder yield is lowered resulting in lowering of the production efficiency on a commercial scale and enlargement of the reaction apparatus is thus necessary. In this method, the concentration of a metal ion is ordinarily in the range of 0.002 to 4 mol/l, preferably 0.01 to 2 mol/l.

Suitable binders which can be used in the present invention include hitherto known thermoplastic resins, thermosetting resins and mixtures thereof.

Suitable thermoplastic resins are those resins which have a softening point of about 150° C. or less, a mean molecular weight of about 10,000 to 200,000 and a degree of polymerization of the order of about 200 to 2,000, for example, a vinyl chloridevinyl acetate copolymer, a vinyl chloride-vinylidene chloride copolymer, a vinyl chloride-acrylonitrile copolymer, an acrylateacrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, an urethane elastomer, a polyvinyl fluoride, a vinylidene chloride-acrylonitrile copolymer, a polyamide, a polyvinyl butyral, cellulose derivatives such as cellulose acetate butyrate, cellulose diacetate, cellulose triacetate, cellulose propionate, cellulose and the like, a styreneacrylonitrile copolymer, a polyester resin, an amino resin, various synthetic rubber based thermoplastic resins such as polybutadiene, polychloroprene, polyisoprene, styrene-butadiene copolymer, butadiene-acrylonitrile copolymer and the like and mixtures thereof.

Examples of these resins which can be used are described in Japanese Pat. Publication Nos. 6877/1962; 12528/1964; 19282/1964; 5349/1965; 20907/1965; 9463/1966; 14059/1966; 16985/1966; 6428/1967; 11621/1967; 4623/1968; 15206/1968, 2889/1969; 17947/1969; 18232/1969; 14020/1970; 14500/1970; 18573/1972; 22063/1972; 22064/1972; 22068/1972; 22069/1972; 22070/1972 and 27886/1973 and U.S. Pat. Nos. 3,114,352; 3,419,420; 3,499,789 and 3,713,887.

Suitable thermosetting resins have a molecular weight of about 20,000 or less as a coating solution and when heated after coating and drying, the molecular weight becomes infinity due to reactions such as condensation, addition and the like. Of these resins, preferred resins are those resins which do not soften or melt before the resin thermally decomposes.

Examples of these resins are a phenol-formalin novolak resin, a phenol-formalin resol resin, a phenol-furfural resin, a xylene-formaldehyde resin, a urea resin, a melamine resin, a drying oil-modified alkyd resin, a phenol resin-modified alkyd resin, a maleic resin-modified alkyd resin, an unsaturated polyester resin, an epoxy resin and hardening agent such as polyamine, acid anhydride, polyamide resin and the like, an isocyanate-terminated polyester moisture-hardening type resin, an isocyanate-terminated polyether moisture-hardening type resin, a polyisocyanate prepolymer such as compound having three or more isocyanate groups in one molecular obtained by reacting a diisocyanate with a low molecular weight triol, trimer, tetramer and pentamer of diisocyanates, a polyisocyanate prepolymer and resin having active hydrogen such as polyester polyol, polyether polyol, acrylic acid copolymer, maleic acid copolymer, 2-hydroxyethyl methacrylate copolymer, p-hydroxystyrene and the like, and mixture thereof.

Suiteable examples of these resins are described in Japanese Pat. Publication Nos. 8103/1964; 9779/1965; 7192/1966; 8016/1966; 14275/1966; 18179/1967; 12081/1968; 28023/1969; 14501/1970; 24902/1970; 13103/1971; 22065/1972; 22066/1972; 22067/1972; 22072/1972; 22073/1972; 28045/1972; 28048/1972; 28922/1972; U.S. Pat. Nos. 3,144,353; 3,320,090; 3,437,510; 3,597,273; 3,781,210 and 3,781,211, etc.

These binders can be used individually or in combination with each other and other additives can be added to the binders. The mixing ratio by weight of the ferromagnetic powder and the binder is 10 to 400 parts by weight, preferably 15 to 200 parts by weight, more preferably 15 to 100 parts by weight of the binder per 100 parts by weight of the ferromagnetic powder.

In addition to the above described binder and ferromagnetic fine powder, additives such as a dispersing agent, a lubricant, an abrasive, an antistatic agent, and the like can be used in the magnetic recording layer.

Suitable dispersing agents are fatty acids containing about 12 to 18 carbon atoms (e.g., having the formula $R_1$ COOH wherein $R_1$ is an alkyl group containing about 11 to 17 carbon atoms), for example, caprylic acid, capric acid, lauric acid, myristic acid, palmitic acid, stearic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; fluorine-containing compounds of the above described fatty acid esters; amides of the above described fatty acids; alkylphosphoric acid esters of polyalkylene oxide; lecithin; trialkylpolyolefinoxy quaternary ammonium salts (alkyl group has 1 to 5 carbon atoms and olefin means ethylene or propylene), etc. In addition, higher alcohols containing about 12 or more carbon atoms and the sulfates thereof can be used. These dispersing agents are generally employed in a proportion of about 0.5 to 20 parts by weight per 100 parts by weight of the binder. Suitable dispersing agents are described in Japanese Pat. Publication Nos. 28369/1964; 17945/1969; 7441/1973; 15001/1973; 15002/1973; 16363/1973 and 4121/1975 and U.S. Pat. Nos. 3,387,993 and 3,470,021. The additives of the present invention can be used together with these dispersing agents without deteriorating the effects of these dispersing agents.

Suitable lubricants which can be used include inorganic fine powders such a molybdenum disulfide, tungsten disulfide and the like; plastic fine powders such as polyethylene, polypropylene, ethylene-vinyl chloride copolymer, polytetrafluoroethylene and the like; α-olefin polymers; unsaturated aliphatic hydrocarbons liquid at room temperature (compounds wherein the double bond of α-olefin is combined with the terminal carbon, the number of carbons: about 20); and fatty acid esters of monobasic fatty acids having 12 to 20 carbon atoms and monohydric alcohols having 3 to 12 carbon atoms. These lubricants are generally used in a proportion of about 0.2 to 20 parts by weight per 100 parts by weight of the binder. These lubricants are described in Japanese Pat. Publication Nos. 18064/1966; 23889/1968; 40461/1971; 15621/1972; 18482/1972; 28043/1972; 32001/1972; and 5042/1975 and U.S. Pat. Nos. 3,470,021; 3,492,235; 3,497,411; 3,523,086; 3,625,760; 3,630,772; 3,642,539; "IBM Technical Disclosure Bulletin", Vol. 9, No. 7 page 779 (December 1966), and "ELECTRONIK", No. 12, page 380 (1961).

Typical abrasive agents which can be used include materials generally used, e.g., fused alumina, silicon carbide, chromium oxide, corumdum, synthetic corundum, diamond, synthetic diamond, garnet, emergy (main component: corundum and magnetite) and the like. Those abrasive agents are used which have an average particle size of about 0.05 to 5 m$\mu$, preferably about 0.1 to 2 m$\mu$. These lubricants are generally used in a proportion of from about 0.5 to 20 parts by weight per 100 parts of the binder. These abrasive agents are described in, for example, Japanese Pat. Publication Nos. 18572/1973; 15003/1973; 15004/1973 (U.S. Pat. No. 3,617,378); 39402/1974 and 9401/1975; U.S. Pat. Nos. 3,007, 807; 3,041,196; 3,293,066; 3,630,910; and 3,687,725; British Pat. No. 1,145,349; and DT-PS No. 853,211. The joint use of these abrasive agents with the additives of the present invention results in decrease of the head abrasiveness due to the abrasive agents.

Antistatic agents which can be used in the present invention include electrically conductive fine powders such as of carbon black, graphite, carbon black grafted polymers, etc.; natural surface active agents such as saponin; nonionic surface active agents such as alkylene oxide based, glycerin based, glycidol based surface active agent and the like; cationic surface active agents such as heterocyclic compounds, e.g., higher alkylamines, quaternary ammonium salts, pyridine and the like, phosphoniums, sulfoniums and the like; anionic surface active agents containing acid groups such as carboxylic acid groups, sulfonic acid groups, phosphoric acid groups, sulfate groups, phosphate groups and the like; and amphoteric surface active agents such as sulfates or phosphates of amino acids, amino sulfonic acids and amino alcohols and the like; etc. The above described electrically conductive fine powder is generally added in a proportion of 0.2 to 20 parts by weight to 100 parts by weight of the binder and the surface active agents are generally added in a proportion of 0.1 to 10 parts by weight.

Examples of the electrically conductive fine powder and surface active agents that can be used as antistatic agents are described in, for example, Japanese Pat. Publication Nos. 22726/1971; 24881/1972; 26882/1972; 15440/1973 and 26761/1973; U.S. Pat. Nos. 2,271,623; 2,240472; 2,288,226; 2,676,122; 2,676,924; 2,676,975; 2,691,566; 2,727,860; 2,730,498; 2,742,379; 2,739,891; 3,068,101; 3,158,484; 3,201,253; 3,210,191; 3,294,540; 3,415,649; 3,441,413; 3,442,654; 3,475,174; and 3,545,974; West German Patent Application (OLS) No. 1,942,665; British Pat. Nos. 1,077,317 and 1,198,450, Ryohei Oda, et al, "Kaimen Kassei Zai no Gosei to so no Oyo (Synthesis of Surface Active Agents and Their Applications)", Maki Shoten, Tokyo (1964), A. M. Schwarts et al, "Surface Active Agents", Interscience Publications Corp., New York (1958), J. P. Sisley et al, "Encyclopedia of Surface Active Agents", Vol. 2, Chemical Publishing Co., New York, "Kaimen Kassei Zai Binran (Handbook of Surface Active Agents)", 6th Ed., Sangyo Tosho Co., Tokyo, Dec. 20, 1966, etc.

These surface active agents can be used individually or in combination with each other. These surface active agents are generally used as antistatic agents, but in some cases, they are used for other purposes, for example, for improving dispersibility, magnetic properties, and lubricity, or as auxiliary coating agents.

Formation of the magnetic recording layer of the present invention is carried out by dissolving, kneading or dispering the above described composition in an organic solvent and then coating the resulting composition onto a non-magnetic support, followed by drying. After the coating but before the drying, this magnetic layer can be subjected to a treatment for orienting the magnetic powder in the laye and if desired, the magnetic layer can be subjected to a surface-smoothening treatment after the drying.

Suitable materials which can be used for producing the non-magnetic support are plastics, for example, polyesters such as polyethylene terephthalate, polyethylene-2,6-naphthalate and the like, polyolefins such as polypropylene and the like, cellulose derivatives such as cellulose triacetate, cellulose, diacetate and the like, polycarbonates, etc., non-magnetic metals such as copper, aluminum, zinc and the like, and ceramics such as glass, porcelain, earthen-ware and the like.

The shape of such a non-magnetic support can be chosen from any of tapes, films, sheets, disks, cards and drums and the material thereof can optionally be chosen from the above described various materials depending on the shape. The thickness of the non-magnetic support is about 2 to 50 m$\mu$ in the case of films, tapes or sheets and about 0.5 to 10 mm in the case of disks or cards. In the case of drums, a suitable cylindrican form is chosen depending on a recorder used.

The above-described non-magnetic support can be subjected to the so-called back coating of the surface opposite to that having the magnetic layer thereon, for the purpose of preventing static charging, magnetic print through, wow flutter and so on in the case of flexible supports such as films, tapes, sheets, thin flexible disks and the like. Suitable back coating techniquea which can be used are described in, for example, U.S. Pat. Nos. 2,804,401, 3,293,066; 3,617,378; 3,062,676; 3,734,772; 3,476,596; 2,643,048; 2,803,556; 2,887,462; 2,923,642; 2,997,451; 3,115,420; 3,166,688; and 3,761,311.

The ferromagnetic powder, binder, colloidal silica, dispersing agent, lubricant, abrasive, antistatic agent, solvent, etc. are mixed and kneaded to prepare a magnetic coating composition. In the kneading, the magnetic powder and other components are charged in a kneading machine simultaneously or separately. For example, in one method, a ferromagnetic powder is added to a solvent containing a dispersing agent and kneaded in a predetermined time to prepare a magnetic coating compositions. For the kneading and dispersing of such a magnetic coating composition, there can be used various kneading machines such for example as two rools mills, three rolls mills, ball mills, pebble mills, trommels, sand grinders, Szegvari attriters, high speed impeller dispersing machines, high speed stone mills, high speed impact mills, dispersing kneaders, high speed mixers, homogenizers, ultrasonic dispersing machines, etc.

The magnetic recording layer can be coated on the support using coating methods such as air doctor coating, blade coating, air knife coating, squeeze coating, dip coating, reverse roll coating, transfer roll coating, gravure coating, kiss coating, cast coating, spray coating and the like, and other methods can also be used. These methods are described in, for example, "Coating Kogaku (Coating Engineering)", pages 253 to 277, published by Asakura Shoten, Tokyo (Mar. 20, 1971).

In the magnetic recording medium of the present invention, a magnetic layer is coated on a non-magnetic support by the above described coating method and then dried. In some cases, two or more magnetic layers can be provided by a continuous coating operation repeating this process or by a simultaneous multilayer coating method as described in Japanese pat. application (OPI) Nos. 98803/1973 (West German Patent Application (OLS) No. 2,309,159) and 99233/1973 (West German Pat. (DT-AS) No. 2,309,158).

Typical organic solvents which can be used in the coating include ketones such as acetone, methyl ethyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; and chlorinated hydrocarbons such as methylene chloride, ethylene chloride, carbon tetrachloride, chloroform, ethylene chlorohydrin, dichlorobenzene and the like. These solvents can be used individually or in combination with each other.

The magnetic layer coated on the support by the above described method is dried after, if desired, the coating has been subjected to a treatment for orienting the magnetic powder in the layer. If required, the magnetic layer can be subjected to a surface-smoothening treatment or cut to the desired shape, thereby to form the magnetic recording substance of the present invention. In particular, it is found in the present invention that a magnetic recording medium having a smooth surface and excellent abrasion resistance can be obtained through the surface smoothening treatment of the magnetic recording layer.

In the orienting treatment for the magnetic layer, the orienting magnetic field can be either an AC or DC magnetic field with a field strength of about 50 to 2000 gauss. The drying temperature of the magnetic layer can range from about 50° to 120° C., preferably 70° to 100° C., more preferably 80° to 90° C., the air flow rate is 1 to 5 Kl/m$^3$/min, preferably 2 to 3 Kl/m$^3$/min and the drying time is about 30 seconds to 10 minutes, preferably 1 to 5 minutes. The orienting direction of the magnetic substance is determined depending upon the intended use thereof. That is to say, the direction is parallel to the lengthwise direction of a tape in the case of sound tapes, small sized video tapes and memory tapes and inclined by about 30 to 90 degrees to the lengthwise direction in the case of broadcasting video tapes.

Suitable orienting methods of magnetic powders are disclosed in U.S. Pat. Nos. 1,949,840; 2,796,359; 3,001,891; 3,172,776; 3,416,949; 3,473,960 and 3,681,138; Japanese Pat. Publication Nos. 3427/1957; 28368/1964; 23624/1965; 23625/1965; 13181/1966; 13043/1973; and 39722/1973 and West German Pat. (DT-AS) No. 1,190,985. The orienting directions of the upper layer and lower layer can be made different.

The foregoing surface-smoothening treatment of the magnetic layer before drying is carried out, as occasion demands, by means of magnet smoothers, smoothening coils, smoothening blades, smoothening blankets, etc., as described in Japanese Pat. Publication Nos. 38802/1972 and 11336/1973, Japanese patent application (OPI) No. 53631/1974 and British Pat. No. 1,191,424.

The surface-smoothening treatment of the magnetic layer after drying is carried out by a calendering treatment or the like. In the case of such a calendering treatment, in particular, the magnetic layer is passed through between a metal roll and a cotton roll or synthetic resin (e.g., nylon) roll according to the supercalendering method. The supercalendering conditions are preferably a roll pressure of about 25 to 100 kg/cm$^2$, preferably 30 to 70 kg/cm$^2$, a temperature of about 35° to 100° C. and a treatment speed of 5 to 120 m/min. If the pressure and temperature exceed the upper limit thereof, the magnetic layer and nonmagnetic support are unfavourably affected, while if the treatment speed is less than about 5 m/min, the surface-smoothening effect cannot be attained and if more than about 120 m/min, the operation is difficult.

These surface-smoothening treatments are described in U.S. Pat. Nos. 2,688,567, 2,998,325 and 3,783,023, West German patent application (DT-OS) No. 2,405,222 and Japanese patent application (OPI) Nos. 53631/1974 and 10337/1975.

According to the present invention, a magnetic recording medium with a low noise can be obtained by adding the colloidal silica of the present invention to a magnetic coating composition during the dispersion thereof without deteriorating the various properties of the magnetic recording medium using a magnetic substance, in particular, ferromagnetic fine powder. It is found according to the present invention that the use of a hydrophobic colloidal silica having at least 70% of the silanol groups on the surface thereof replaced by methyl groups, in particular, results in marked advantages since when colloidal silica not treated is added, the magnetic layer is hygroscopic and the magnetic flux density is deteriorated due to oxidation in a magnetic recording medium using a ferromagnetic fine powder.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following example. All parts, percents, ratios and the like are by weight unless otherwise indicated.

EXAMPLE 1

In a DC magnetic field of 1000 gauss, 1 mol/l of sodium borohydride was added to an aqueous solution containing 0.685 mol/l of ferrous sulfate, 0.305 mol/l of cobalt sulfate and 0.010 mol/l of chrome alum to obtain a ferromagnetic alloy fine powder. The resulting alloy fine powder had such a shape that, on the average, 10 to 15 particles with a diameter of about 400 A were chained, and had a composition of Fe 69, Co 30 and Cr 1 containing about 3% of B.

| Polyesterpolyurethane<br>(Reaction product of polyethylene adipate and 4,4'-diphenylmethane diisocyanate having a mean molecular weight of 130,000 as styrene weight) | 20 parts |
|---|---|
| Synthetic Nondrying Oil Modified Alkyd Resin<br>(Solution containing 70% solid of a reaction product of glycerine, phthalic anhydride and glycidyl ester of fatty acid synthesized by Koch method in methyl isobutyl ketone/xylene, Oil length: 29%, Hydroxyl value: about 130) | 25 parts |
| Oleic Acid | 3 parts |
| Silicone Oil (dimethylpolysiloxane) | 3 parts |
| Colloidal Silica Variable as shown in Table 1<br>(AEROSIL R-972, commercial name made by Nippon Aerosil Co., Mean diameter: 16 mµ, 70% of silanol groups being replaced by methyl groups) | |
| Methyl Isobutyl Ketone (MIBK) | 600 parts |

300 parts of the above described alloy fine powder and this composition were charged in a ball mill, kneaded and dispersed for 24 hours, to which 20 parts of a polyisocyanate compound (Desmodur L-75, commercial name made by Bayer AG, 75% solution of an adduct of 3 mols of tolylene diisocyanate and 1 mol of trimethylpropane in ethyl acetate) was added. The resulting mixture was then subjected to dispersion under high speed shearing for 1 hour and filtered by means of a filter with a mean pore diameter of 3 microns, thus obtaining a magnetic coating composition.

The above described magnetic coating composition was coated onto a polyethylene terephthalate film of 22 microns in thickness to give a thickness of 3 microns on dry base by doctor coating, subjected to an orienting treatment in a DC magnetic field of 2500 gauss for 0.02 second, dried at 100° C. for 2 minutes with an air flow rate of 2 Kl/m³/min and then subjected to a supercalendering treatment at 60° C. under a pressure of 60 Kg/cm² at a speed of 40 m/min, thus obtaining a wide magnetic recording film. The resulting film was slit to give a video tape of ½ inch in width.

In the following Table 1 are shown the quantity of colloidal silica added (% by weight based on the weight of the ferromagnetic fine powder) and the properties of the resulting video tapes (C Nos.: Comparative Examples).

TABLE 1

| Sample No. | Amount of Colloidal Silica (%) | Maximum Magnetic Flux Density (a) (gauss) | Squareness Ratio (b) | Output (c) (dB) | Noise (d) (dB) | Durability (e) (min) | Powder Scraped (f) (mg) |
|---|---|---|---|---|---|---|---|
| C-1 | 0 | 4320 | 0.88 | 5.6 | 5.3 | 30 | less than 1 |
| C-2 | 1 | 4300 | 0.88 | 5.6 | 4.5 | 30 | 1 |
| 1 | 2 | 4280 | 0.88 | 5.6 | 2.9 | 30 | 1 |
| 2 | 4 | 4210 | 0.88 | 5.6 | 2.4 | 30 | 1 |
| 3 | 6 | 4170 | 0.88 | 5.6 | 2.2 | 30 | 1 |
| 4 | 8 | 4050 | 0.88 | 5.6 | 2.0 | 30 | 1 |
| 5 | 10 | 3940 | 0.88 | 5.4 | 2.0 | 35 | 2 |
| 6 | 15 | 3870 | 0.88 | 5.2 | 2.1 | 35 | 2 |
| 7 | 20 | 3760 | 0.88 | 5.0 | 2.0 | 35 | 3 |
| C-3 | 25 | 3550 | 0.88 | 4.7 | 1.9 | 35 | 11 |
| C-4 | 30 | 3290 | 0.88 | 4.1 | 1.9 | 40 | 21 |

The accompanying drawing is a graph showing the relation of the quantity of the colloidal silica of Example 1 with the output and noise of the video tape, in which the broken line corresponds to the output and the solid line corresponds to the noise.

Measurement of the properties shown in Table 1 is carried by the following methods:

(a) Maximum Magnetic Flux Density: The resulting video tape is subjected to measurement in an external magnetic field of 3000 Oe using a measuring machine (VSM-III, commercial name manufactured by Toei Kogyo K. K.).

(b) Squareness Ratio: Ratio of the residual magnetic flux density to the maximum magnetic flux density measured in an external magnetic field of 3000 Oe.

(c) Output: Reproduced video output, represented by a relative value to the standard value of a $CrO_2$ tape, when a standard signal of 5 MHz is recorded by the optimum recording current using an EIAJ Type I VTR (Electronic Industries Association of Japan). Measuring machine: AV-8700 made by SONY Corp.

(d) Noise: Represented by a relative value to the standard value of a $CrO_2$ tape. The output of a noise reproduced through modulation in 4 MHz when a standard signal of 5 MHz is reproduced is measured by means of a frequency spectrum analyzer. Measuring machine: FSA-1 B made by Ando Denki K. K.

(e) Durability: Time until an abnormal condition appears on a monitor TV when a test pattern is recorded and reproduced by still mode.

(f) Powder Scraped: Weight of a magnetic layer adhered to a head or scraped by a head when a tape of 50 m in length is reciprocated 100 times at a speed of 5.0 m/sec in a tape recorder provided with a dummy fixed head having a contact length of 2.0 mm with a magnetic layer.

It will clearly be understood from the accompanying drawing and Table 1 that, in a magnetic recording medium using a magnetic coating composition to which the colloidal silica of the present invention is added, the noise level is largely decreased in spite of that the output is substantially the same as that of a comparative magnetic recording medium without addition of the colloidal silica. If the quantity of the colloidal silica of the present invention is less than 2%, the effect of decreasing the noise level is small, while if more than 20%, the saturated magnetic flux density is decreased thus to lower the output somewhat and to increase the powder scraped. Moreover, it is apparent that the squareness ratio and durability are substantially independent upon the quantity of the colloidal silica.

COMPARATIVE EXAMPLE 1

The procedures of Example 1 were repeated except that a colloidal silica having a mean diameter of about 12 mμ but no methyl groups on the surface (Aerosil 200, commercial name, manufactured by Nippon Aerosil Co.) was used in place of the colloidal silica used in Example 1, thus obtaining a video tape. In the following Table 2 are shown the quantity of the colloidal silica used and the properties of the resulting video tape, in which the properties are measured in an analogous manner to Table 1.

TABLE 2

| Sample No. | Quantity of Colloidal Silica (%) | Maximum Magnetic Flux Density (gauss) | Squareness Ratio | Output (dB) | Noise (dB) | Durability (min) | Powder Scraped (mg) |
|---|---|---|---|---|---|---|---|
| C-1 | 0 | 4320 | 0.88 | 5.6 | 5.3 | 30 | less than 1 |
| C-5 | 4 | 4170 | 0.88 | 5.6 | 3.1 | 30 | 12 |
| C-6 | 8 | 3980 | 0.88 | 5.6 | 2.9 | 30 | 18 |
| C-7 | 20 | 3730 | 0.88 | 4.9 | 2.9 | 30 | more than 30 |
| C-8 | 30 | 3240 | 0.88 | 4.0 | 2.7 | 35 | more than 30 |

It is apparent from Table 1 and Table 2 that the colloidal silica having no methyl groups on the surface gives a higher noise level as compared with that having methyl groups, even if the particle size is small.

COMPARATIVE EXAMPLE 2

The procedures of Example 1 were repeated except that a finely powdered silica having a mean particle size of 0.6μ but no methyl groups on the surface was used instead of the colloidal silica used in Example 1, thus obtaining a video tape. In Table 3 are shown the quantity of the finely powdered silica used and the properties of the resulting video tape.

TABLE 3

| Sample No. | Quantity of Colloidal Silica (%) | Maximum Magnetic Flux Density (gauss) | Squareness Ratio | Output (dB) | Noise (dB) | Durability (min) | Powder Scraped (mg) |
|---|---|---|---|---|---|---|---|
| C-1 | 0 | 4320 | 0.88 | 5.6 | 5.3 | 30 | less than 1 |
| C-9 | 4 | 4170 | 0.88 | 5.2 | 5.1 | 30 | less than 1 |
| C-10 | 8 | 3890 | 0.88 | 5.0 | 5.0 | 40 | less than 1 |
| C-11 | 20 | 3540 | 0.88 | 4.6 | 4.5 | 45 | 5 |

It is apparent from the results of Table 3 that the silica having a larger particle size and no methyl groups on the surface cannot give the effects according to the present invention.

COMPARATIVE EXAMPLE 3

The procedures of Example 1 were repeated except that a finely powdered silica having methyl groups on the surface and a variable particle size as shown in Table 4 was used instead of the colloidal silica used in Example 1, thus obtaining a video tape. In the following Table 4 are shown the particle size of the finely powdered silica with a constant quantity thereof and the properties of the resulting video tape, in which the properties are measured in an analogous manner to Table 1.

TABLE 4

| Sample No. | Particle size (mμ) | Quantity of Silica (%) | Maximum Magnetic Flux Density (gauss) | Squareness Ratio | Output (dB) | Noise (dB) | Durability (min) | Powder Scraped (mg) |
|---|---|---|---|---|---|---|---|---|
| 4 | 16 | 8 | 4050 | 0.88 | 5.6 | 2.0 | 30 | 1 |
| 8 | 40 | 8 | 4120 | 0.87 | 5.6 | 2.8 | 35 | 1 |
| C-12 | 600 | 8 | 4160 | 0.87 | 5.6 | 4.4 | 35 | 1 |
| C-13 | 2300 | 8 | 4200 | 0.87 | 5.6 | 5.1 | 40 | 1 |

It is apparent from Table 4 that if the particle size of the finely powdered silica is large, the noise level is increased and the effects of the present invention cannot be given even if the surface is made hydrophobic by replacement of methyl groups.

| Comparative Example 4 | |
|---|---|
| Polyesterpolyurethane (same as that of Example 1) | 20 parts |
| Synthetic Nondrying Oil Modified Alkyd Resin (same as that of Example 1) | 25 parts |
| MIBK | 10 parts |
| Colloidal Silica | Variable as shown in Table 5 |

The above described composition was kneaded and dispersed at a temperature of 60° C. for 60 minutes using a kneader. Then, 40 parts of MIBK was added thereto and the resulting mixture was dispersed two times by means of a three rolls mill.

| Fe—Co—Cr Alloy Fine Powder | 300 parts |

| | |
|---|---|
| (same as that of Example 1) | |
| Oleic Acid | 3 parts |
| Silicone Oil | 3 parts |
| (dimethylpolysiloxane) | |
| MIBK | 550 parts |

After the dispersing, the above described composition was added thereto and the resulting mixture was then subjected to the similar steps of dispersing and coating to those of Example 1, thus obtaining a video tape. In the following Table 5, there are shown the kinds and quantities of colloidal silica added and the properties of the resulting video tapes, in which the properties are measured in an analogous manner to Table 1.

TABLE 5

| Sample No. | Kinds of Colloidal Silica | Quantity of Colloidal Silica (parts) | Maximum Magnetic Flux Density (gauss) | Squareness Ratio | Output (dB) | Noise (dB) | Durability (min) | Powder Scraped (mg) |
|---|---|---|---|---|---|---|---|---|
| C-1 | — | 0 | 4320 | 0.88 | 5.6 | 5.3 | 30 | less than 1 |
| C-14 | R-972 | 12 | 4250 | 0.88 | 5.6 | 4.8 | 45 | less than 1 |
| C-15 | R-972 | 24 | 4130 | 0.88 | 5.6 | 4.6 | 50 | less than 1 |
| C-16 | 200 | 12 | 4230 | 0.87 | 5.6 | 4.9 | 40 | less than 1 |
| C-17 | 200 | 24 | 4100 | 0.87 | 5.5 | 4.6 | 45 | less than 1 |

It is apparent from Table 5 that, when the colloidal silica is firstly mixed with a binder and a ferromagnetic fine powder is then added thereto, the durability is somewhat improved but the noise level is not so improved, as compared with the case of adding no colloidal silica.

COMPARATIVE EXAMPLE 5

The video tapes obtained in Example 1 and Comparative Example 1 were stored for one week in an atmosphere at 60° C. and 90% RH and then subjected to measurement of the deterioration of the saturated magnetic flux density due to temperature and humidity, thus obtaining results shown in Table 6.

TABLE 6

| Sample No. | Kinds of Colloidal Silica | Quantity of Colloidal Silica (%) | Maximum Magnetic (gauss) Before Treatment | Flux Density After Treatment | Change Ratio (%) |
|---|---|---|---|---|---|
| C-1 | — | 0 | 4320 | 4060 | −6 |
| 2 | R-972 | 4 | 4210 | 3960 | −6 |
| 4 | R-972 | 8 | 4050 | 3770 | −7 |
| C-5 | 200 | 4 | 4170 | 3750 | −10 |
| C-6 | 200 | 8 | 3980 | 3500 | −12 |

In this table, the maximum magnetic flux density is measured in the similar manner to Table 1.

It is apparent from Table 6 that, even if AEROSIL R-972 having methyl groups on the surface is added, the deterioration of the magnetic properties due to temperature and humidity is substantially the same as in the case of no addition, while a considerable deterioration takes place in the case of adding AEROSIL 200 having no methyl group on the surface.

As can be seen from the foregoing Examples and Comparative Examples, when the colloidal silica having methyl groups on the surface is added to a magnetic coating composition according to the present invention, it is possible to lower to a greater extent the noise level of a magnetic recording medium using a ferromagnetic fine powder, in particular, liquid phase reduction type alloy fine powder, which has hitherto been considered to be difficult, and this magnetic recording medium is freed from deterioration of the magnetic properties due to temperature and humidity even after the passage of time. The effect of lowering the noise level according to the present invention can similarly be obtained in the case of using ferromagnetic iron oxides and chromium dioxide.

Furthermore, it is to be noted that the method and intended use for using the colloidal silica of the present invention are completely different from those described in Japanese Patent Application (OPI) Nos. 11909/1974 and 12802/1974.

What is claimed is:

1. In a magnetic recording medium comprising a magnetic layer supported on a non-magnetic support and wherein the magnetic layer comprises a ferromagnetic fine powder, a binder and a colloidal silica, the improvement comprising employing as the magnetic layer, a composition prepared by dispersing the ferromagnetic fine powder in from 10 to 400 parts by weight, per 100 parts by weight of the ferromagnetic fine powder, of the binder while simultaneously adding thereto 2 to 20 parts by weight, based on 100 parts by weight of the ferromagnetic powder, of a colloidal silica having a diameter of 7 to 50 m$\mu$ and methyl groups on the surface thereof and which is prepared by treating a colloidal silica having silanol groups on the surface thereof with methanol, trimethylmonochlorosilane or dimethyldichlorosilane to replace at least 70% of the silanol groups with methyl groups; the ferromagnetic fine powder being one in which the ferromagnetic metal consists essentially of at least one metal selected from the group consisting of Fe, Co, Ni, Fe-Co, Fe-Ni, Co-Ni and Fe-Co-Ni.

2. The magnetic recording medium as claimed in claim 1, wherein the colloidal silica is obtained by heating a colloidal silica in methanol at the boiling point.

3. The magnetic recording medium as claimed in claim 1, wherein the colloidal silica is obtained by treating a colloidal silica in methanol vapor for 30 minutes to 6 hours.

4. The magnetic recording medium as claimed in claim 1, wherein the colloidal silica is obtained by treating a colloidal silica and tetrachlorosilane with methanol vapor for 30 minutes to 6 hours.

5. The magnetic recording medium as claimed in claim 1, wherein the colloidal silica is obtained by heating a colloidal silica with dimethyldichlorosilane and steam at 400° C. in a fluidized bed using an inert gas such as nitrogen gas as a carrier.

6. The magnetic recording medium as claimed in claim 1, wherein the binder is at least one material selected from the group consisting of thermoplastic resins and thermosetting resins.

7. The magnetic recording medium as claimed in claim 1, wherein the magnetic layer further contains additives selected from the group consisting of dispersing agents, lubricants, abrasives, and antistatic agents.

8. The magnetic recording medium as claimed in claim 1, wherein the non-magnetic support is of a material selected from the group consisting of polyethylene terephthalate, polyethylene-2,6-naphthalate, polypropylene, cellulose triacetate, cellulose diacetate, polycarbonate, copper, aluminum, zinc, glass and ceramics.

9. The magnetic recording medium as claimed in claim 1, wherein the non-magnetic support has a thickness of 2 to 50 m$\mu$ in the case of a film, a tape or sheet and a thickness of 0.5 to 10 mm in the case of a disk or a card.

10. The magnetic recording medium as claimed in claim 1, wherein the colloidal has a diameter of 10 to 30 m$\mu$.

* * * * *